United States Patent [19]
Klein

[11] Patent Number: 5,806,460
[45] Date of Patent: *Sep. 15, 1998

[54] NECTAR FEEDER ACCESS DEVICES

[76] Inventor: Arnold G. Klein, P.O. Box 724, Sandia Park, N. Mex. 87047

[*] Notice: The term of this patent shall not extend beyond the expiration date of Pat. No. 5,640,927.

[21] Appl. No.: 789,057

[22] Filed: Jan. 28, 1997

Related U.S. Application Data

[63] Continuation-in-part of Ser. No. 435,537, May 5, 1995, Pat. No. 5,640,927.

[51] Int. Cl.$^6$ .................................................. A01K 39/02
[52] U.S. Cl. ................................................................ 119/72
[58] Field of Search ........................... 119/72, 57.8, 57.9, 119/52.3, 77

[56] References Cited

U.S. PATENT DOCUMENTS

| | | |
|---|---|---|
| 1,241,352 | 9/1917 | Doering et al. . |
| 3,125,069 | 3/1964 | Fowler . |
| 3,301,220 | 1/1967 | Queen . |
| 3,324,906 | 6/1967 | Chu . |
| 3,558,022 | 1/1971 | Zytko . |
| 4,901,673 | 2/1990 | Overstreet . |
| 5,025,753 | 6/1991 | Schneider ............................. 119/57.8 X |
| 5,062,390 | 11/1991 | Bescherer et al. .......................... 119/72 |
| 5,450,816 | 9/1995 | Santa Cruz ................................ 119/72 |

*Primary Examiner*—Gene Mancene
*Assistant Examiner*—Yvonne R. Abbott
*Attorney, Agent, or Firm*—DeWitt M. Morgan, Esq.

[57] ABSTRACT

A device for use on various nectar-type bird feeders, that prevents insect contamination. The device presents an effective physical barrier to the entry of insects, but is easily penetrated by the bill of a feeding bird. The device can be constructed to fit any of the currently available nectar feeder configurations or may be incorporated into feeders, specially adapted.

25 Claims, 25 Drawing Sheets

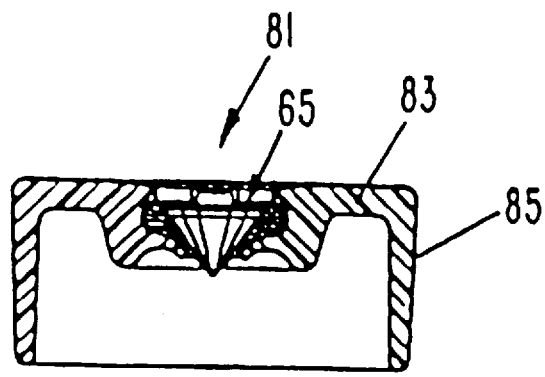
FIG-10
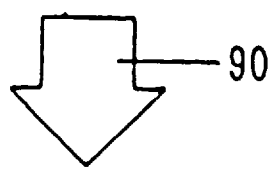
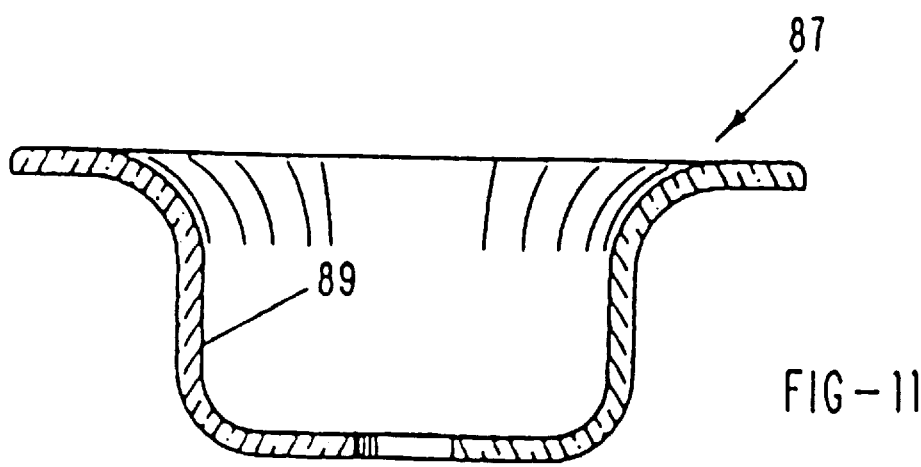
FIG-11

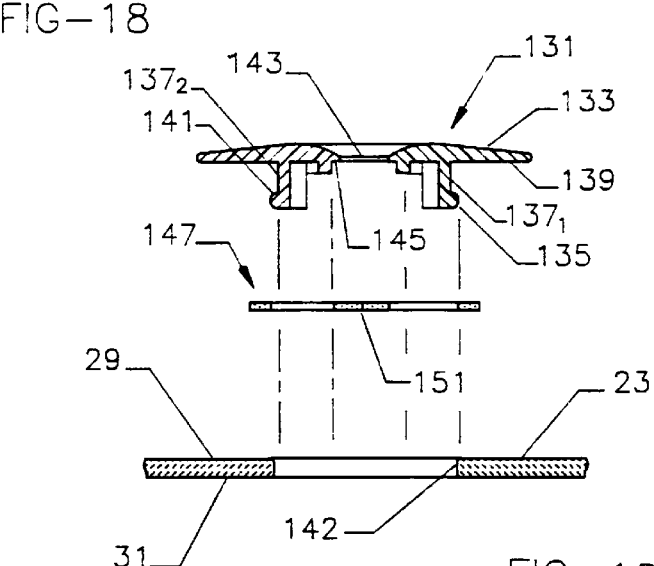
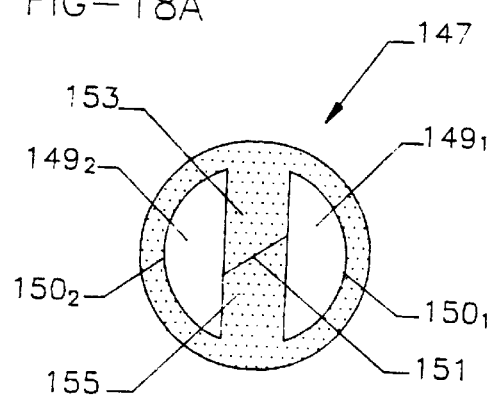
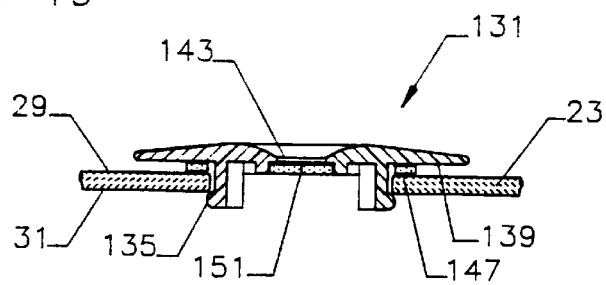

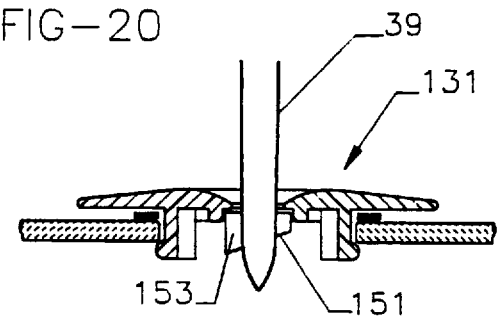
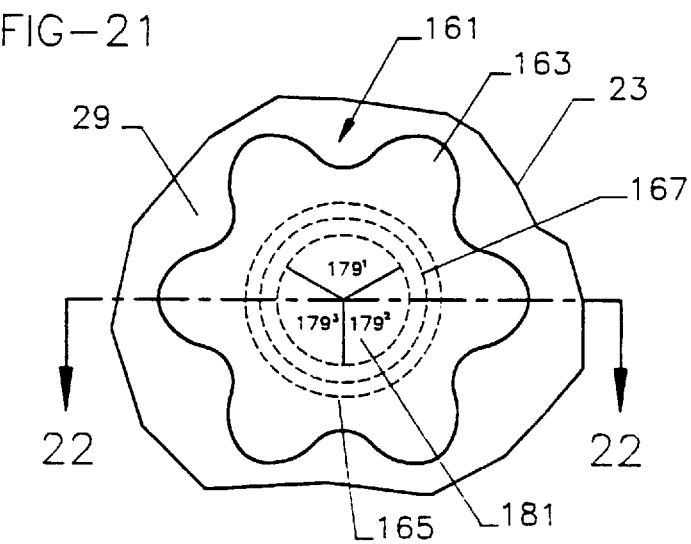
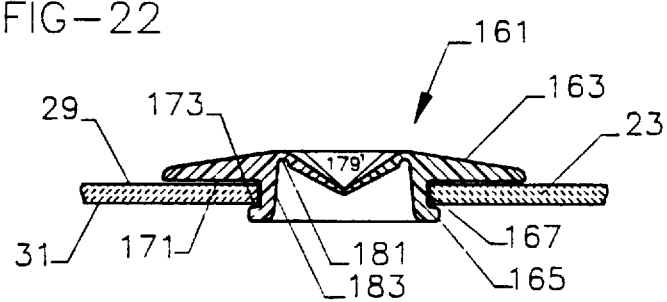

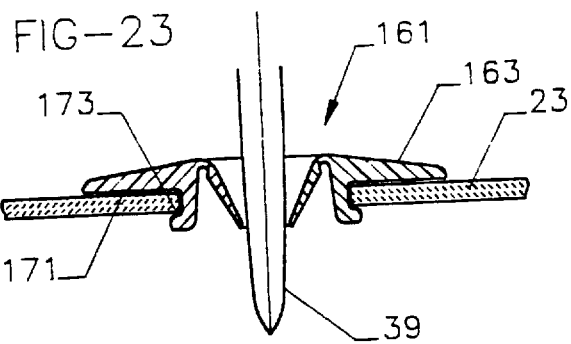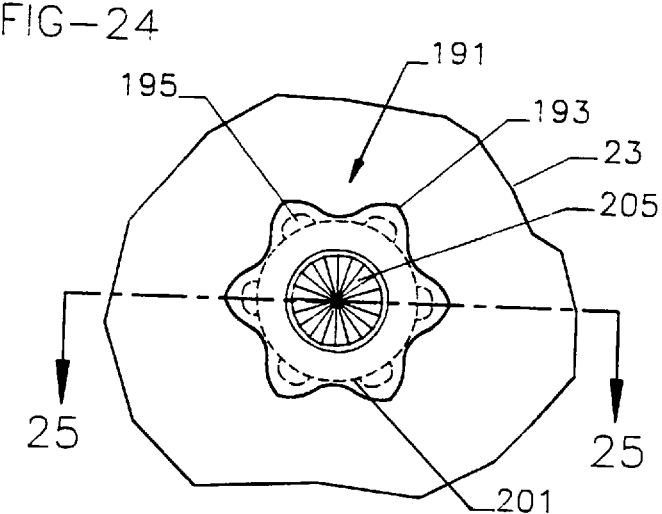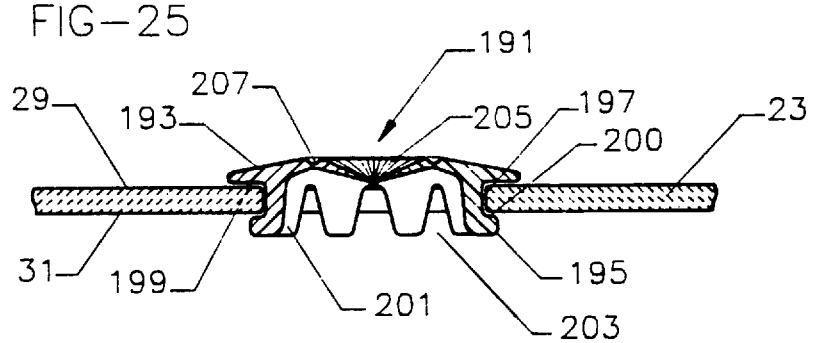

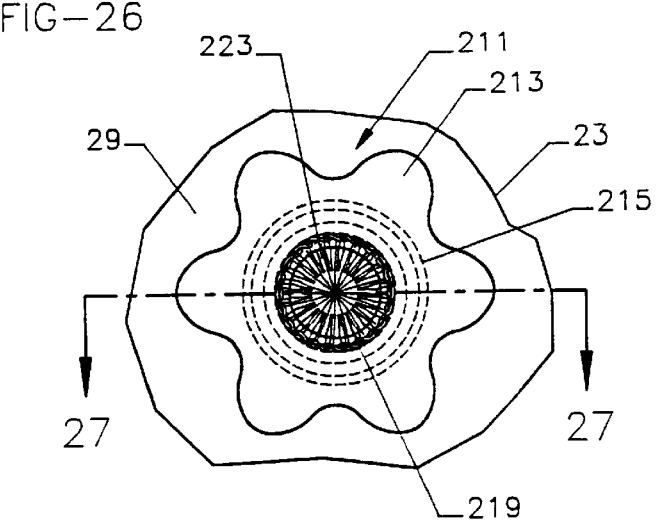
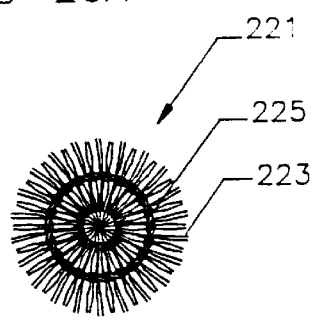
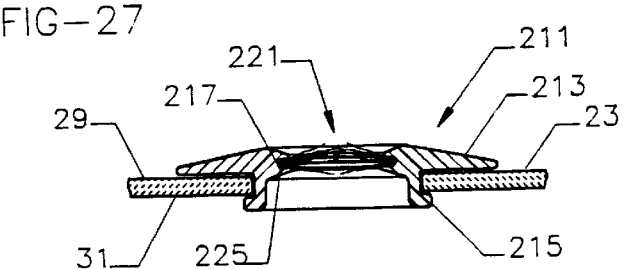
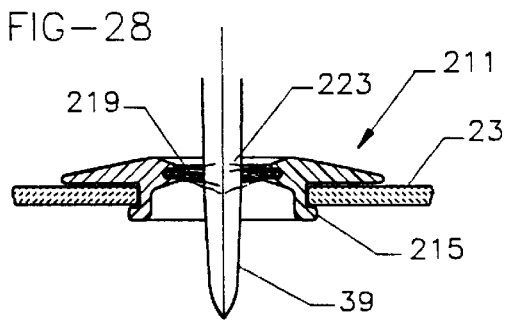

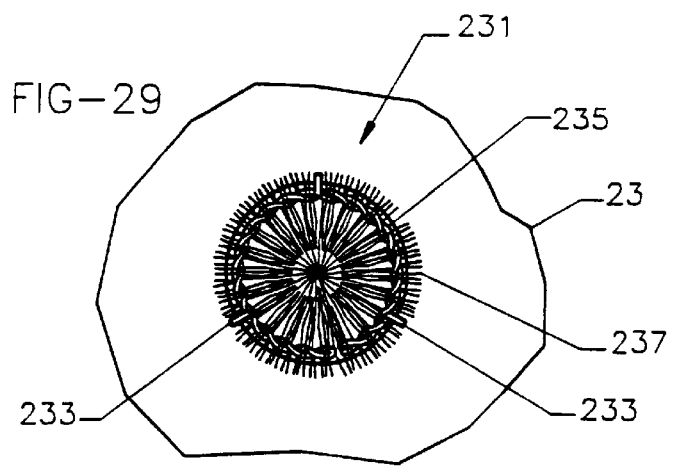
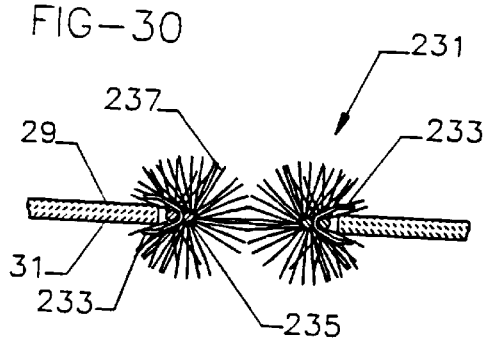
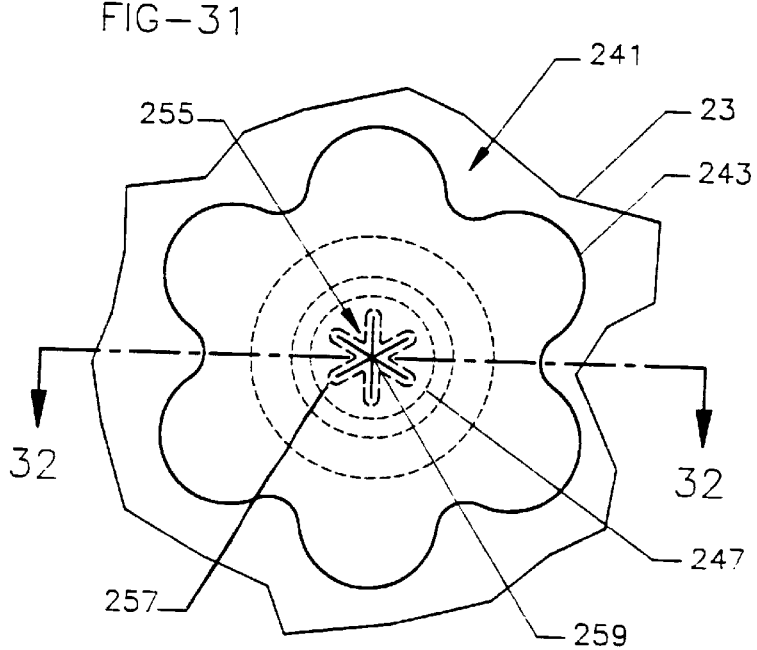

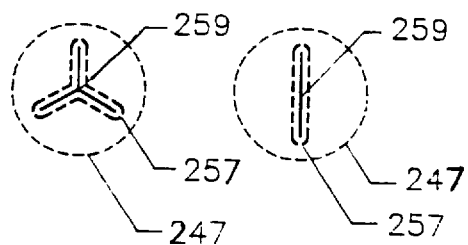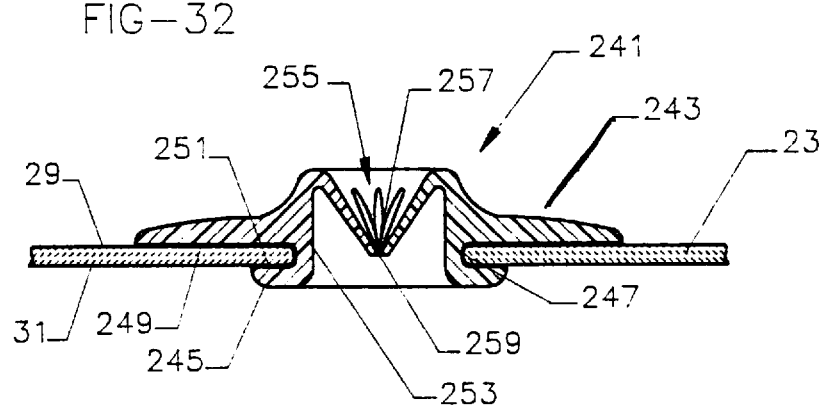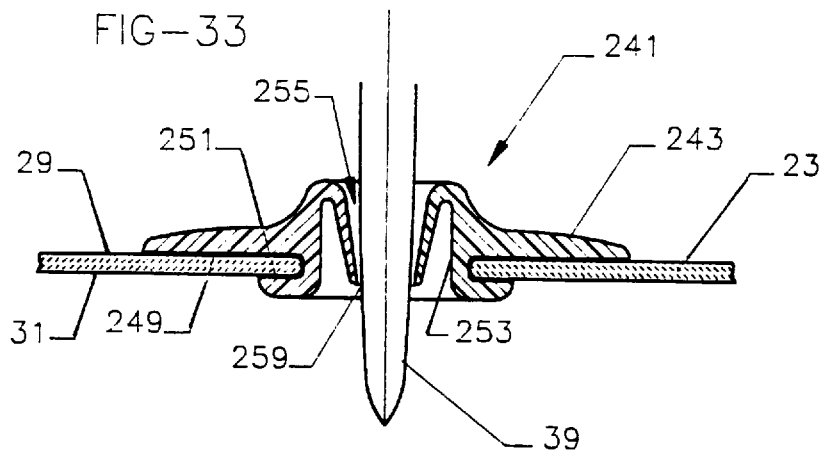

5,806,460

NECTAR FEEDER ACCESS DEVICES

This application is a continuation-in-part of Ser. No. 435,537 filed May 5, 1995, now U.S. Pat. No. 5,640,927.

FIELD OF THE INVENTION

The present invention relates to access devices for bird feeders and feeders incorporating such devices. More specifically, the present invention relates to feeder access devices that act to restrict insects from feeding at and/or contaminating nectar type bird feeders.

BACKGROUND OF THE INVENTION

Insect feeding and contamination of nectar feeders is a familiar problem and numerous attempts have been made to deter insects from feeding and contaminating nectar feeders. The most frequently used approach is to use a liquid filled moat to prevent crawling insects from reaching the feeder. These moats are either hung interposed as in "Insect Trap for a Bird Feeder" of Hiday, U.S. Pat. No. 4,980,990, or incorporated as a portion of the feeder as in "Hummingbird Feeder" of Queen, U.S. Pat. No. 3,301,220. These moat designs require regular refilling, unpleasant cleaning, and do not protect the feeder from flying insects. Bee and ant guards are incorporated in the "Hummingbird Feeding Device" of Fowler U.S. Pat. No. 3,125,069.

Although not related to nectar feeders, U.S. Pat. No. 3,558,022 to Zytko et al. discloses a "Container Safety Closure" that is penetrated with a dispensing dropper. The structure of this device is unsuitable for use in protecting nectar feeders from contamination for a number of reasons: First, the device is intended to form a tight hermetic seal. As such, it would require a relatively high displacement force to allow for the penetration of a bird's bill. Second, along with this high displacement force, and due to the high frictional coefficient of resilient materials, there would be a large frictional resistance to the penetration and withdrawal of a bird's bill. Third, the structure of the device would serve to trap insects at its lowest point, once there, they would have a high probability of being introduced into the feeder by a penetrating bill. Finally, the structure of the device does not lend itself to installation on any known nectar feeder type.

Whatever precise merits, features, and advantages of the above cited references, none of them achieves or fulfills the purpose of the nectar feeder access device of the present invention.

The principal object of the present invention is to provide simple devices to be installed on nectar feeders which will permit easy penetration of the bird's bill, while restricting the entry of any insect life. It is also the object of the present invention to provide such devices as can be readily installed on many of the popular nectar feeder configurations. A further object is to provide devices that can be integrated into a new design of nectar feeder, which are simple, reliable, and inexpensive to manufacture.

SUMMARY OF THE INVENTION

A restrictive access device constructed to allow for secure attachment in or over the feeder opening in the body of a nectar-type bird feeder. The restrictive access device having an incorporated structure that presents a physical barrier to insect entry at the feeder opening. The insect barrier portion of the device consisting of a normally closed passageway that is adapted to be readily opened when pushed or penetrated by a bird's bill. This passageway is biased to return to the normally closed position when the bird's bill is withdrawn.

Other and further objects of the present invention will be apparent from the following description and claims, and are illustrated in the accompanying drawings, which by way of illustration, show a series of embodiments of the present invention and the principles thereof, and what is now considered to be the best mode in which to apply these principles. Other and different embodiments of the invention embodying the same or equivalent principles may be used and structural changes may be made as desired by those skilled in the art without departing from the invention.

BRIEF DESCRIPTION OF THE DRAWINGS

FIG. 10 depicts, on a different scale, a side cross sectional view of the restrictive access device of FIG. 5 configured to fit in place of a conventional bee guard;

FIG. 11 depicts a side cross sectional view of a conventional hummingbird feeder flower cup;

FIG. 18 depicts a side cross sectional and exploded view of the component parts of the device of FIG. 17;

FIG. 18A depicts a top view of the removable flap type barrier of FIG. 18;

FIG. 19 depicts a side cross sectional view of the device of FIG. 17;

FIG. 20 depicts the restrictive access device of FIGS. 17, 18 and 19 being penetrated by a bird's bill;

FIG. 21 depicts a top view of an integrally constructed, flap type barrier access device;

FIG. 22 depicts a side cross sectional view of the restrictive access device of FIG. 21;

FIG. 23 depicts a side cross sectional view of the device of FIG. 21 being penetrated by a bird's bill;

FIG. 24 depicts a top view of an integrally constructed, bristle or filament type barrier restrictive access device;

FIG. 25 depicts, on an enlarged scale, a side cross sectional view of the device of FIG. 24;

FIG. 26 depicts a top view of a two piece, bristle or filament type barrier restrictive access device;

FIG. 26A depicts the bristle or filament type barrier insert of the device of FIG. 26;

FIG. 27 depicts a side cross sectional view of the device of FIG. 26;

FIG. 28 depicts the device of FIGS. 26 and 27 being penetrated by a bird's bill;

FIG. 29 depicts a top view of a unitary construction bristle or filament type barrier, restricted access device of the invention;

FIG. 30 depicts a side cross sectional view of the device of FIG. 29;

FIG. 31 depicts a top view of a unitarily constructed, fluted type barrier restrictive access device of the present invention;

FIG. 31A depicts a top view of a fluted type barrier structure of the type illustrated in FIG. 31, having a triple flute closure;

FIG. 31B depicts a top view of a fluted type barrier structure of the type illustrated in FIG. 31, having a single flute closure;

FIG. 32 depicts a side cross sectional view of the device of FIG. 31;

FIG. 33 depicts a side cross sectional view of the device of FIG. 31 being penetrated by a bird's bill;

DETAILED DESCRIPTION OF THE PREFERRED EMBODIMENTS

Figure 1:
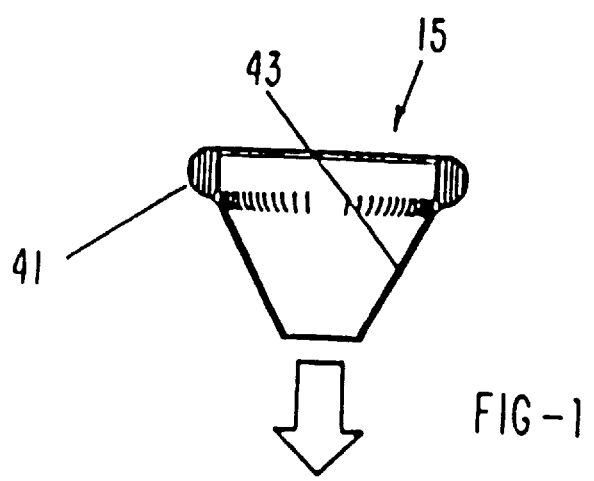
FIG. 1 depicts a side cross sectional view of a tubular shaped barrier insert for the restrictive access device of the invention.
Figure 2:
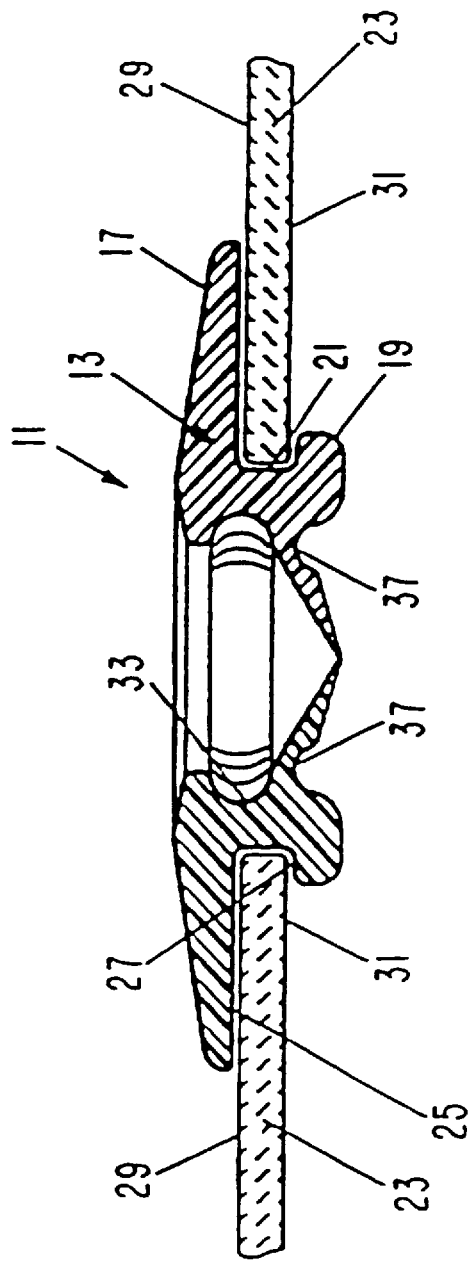
FIG. 2 depicts a side cross sectional view of the resilient housing adapted to hold the barrier insert of FIG. 1.
Figure 3:
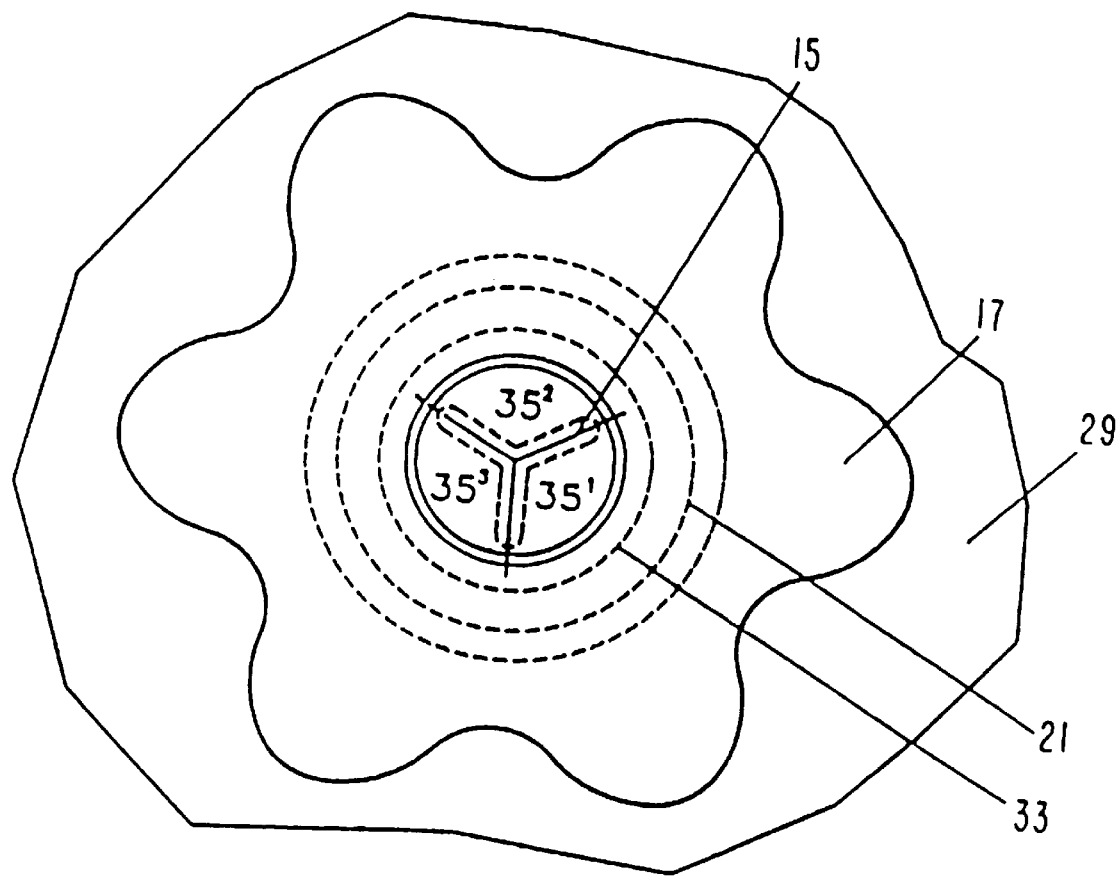
FIG. 3 depicts a top view of the assembled restrictive access device of FIG. 1 and FIG. 2.
Figure 4:
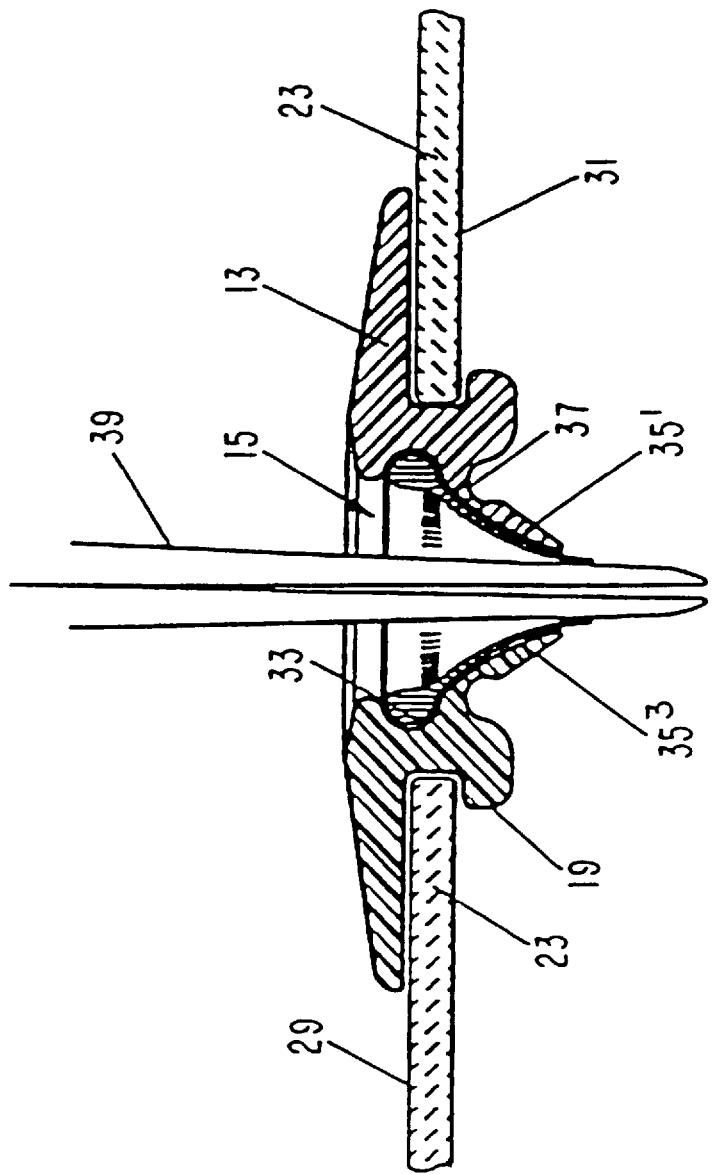
FIG. 4 depicts a side cross sectional view of the restrictive access device of FIG. 3 being penetrated by a bird's bill.

With reference to FIGS. 1–4, access device 11 includes an annular housing 13 and an barrier insert 15. Housing 13, which is made of a resilient material (such as silicone, neoprene, or urethane), includes an outer lip 17 and an inner lip 19 which are interconnected by an exterior annular groove 21. The width of the groove 21 is approximately equal to the thickness of feeder body 23 (of a typical nectar-type bird feeder), whereby surfaces 25 and 27 are in engagement with feeder body surfaces 29 and 31. Housing 13 also includes an interior annular groove 33 and a plurality of pie-shaped flaps $35^1$, $35^2$, and $35^3$ which are naturally biased towards the closed position as illustrated in FIG. 2. Reduced section at 37 decreases the thickness of the material where flaps $35^1$, $35^2$, and $35^3$ join housing 13 and, in effect, forms a hinge 37, to permit the barrier flaps to be pushed inward by the force of a hummingbird's bill 39, as illustrated in FIG. 4. Finally, because hummingbirds are extremely sensitive to any surface friction encountered by their bill and, in fact, will not attempt to push barrier flaps $35^1$, $35^2$, and $35^3$ aside if any surface friction is encountered (such as is typical of resilient materials), it is necessary that the exterior surface of the flaps $35^1$, $35^2$, and $35^3$, or barrier insert surface 15 be of low friction. This can be accomplished by using a specially formulated resilient material having low friction characteristics, using a low friction coating, such as Teflon, to coat the panels $35^1$, $35^2$, and $35^3$, or finally, providing barrier insert 15 with inside wall 43 formed of low friction material.

Barrier insert 15 is made of a low friction, pliable material and, in its free state has the shape of a thin walled, tapered, cylinder. Barrier insert 15 has a thickened lip 41 at the larger end, which lip is received in interior annular groove 33. The insert 15 is maintained in the closed position by the pinching forces of the flaps $35^1$, $35^2$, and $35^3$ in three locations, as best illustrated in FIG. 3, by the opposing edges of flaps $35^1$–$35^2$, $35^2$–$35^3$, and $35^3$–$35^1$.

Penetration of the nectar feeder barrier by the hummingbird bill 39 is illustrated in FIG. 4. Bill 39 passes through the device barrier by pushing the resilient flaps $35^1$, $35^2$, and $35^3$ downward. When the bill is withdrawn, the barrier returns to the naturally closed position as shown in FIG. 3.

Figure 5:
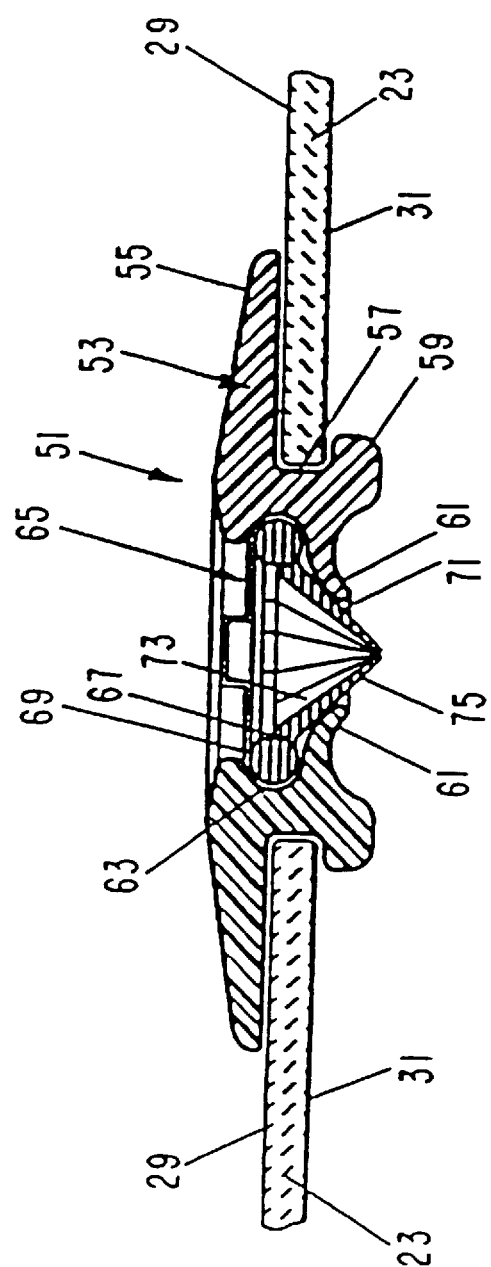
FIG. 5 depicts a side cross sectional view of an alternate restrictive access device that incorporates a flap type barrier insert.
Figure 6:
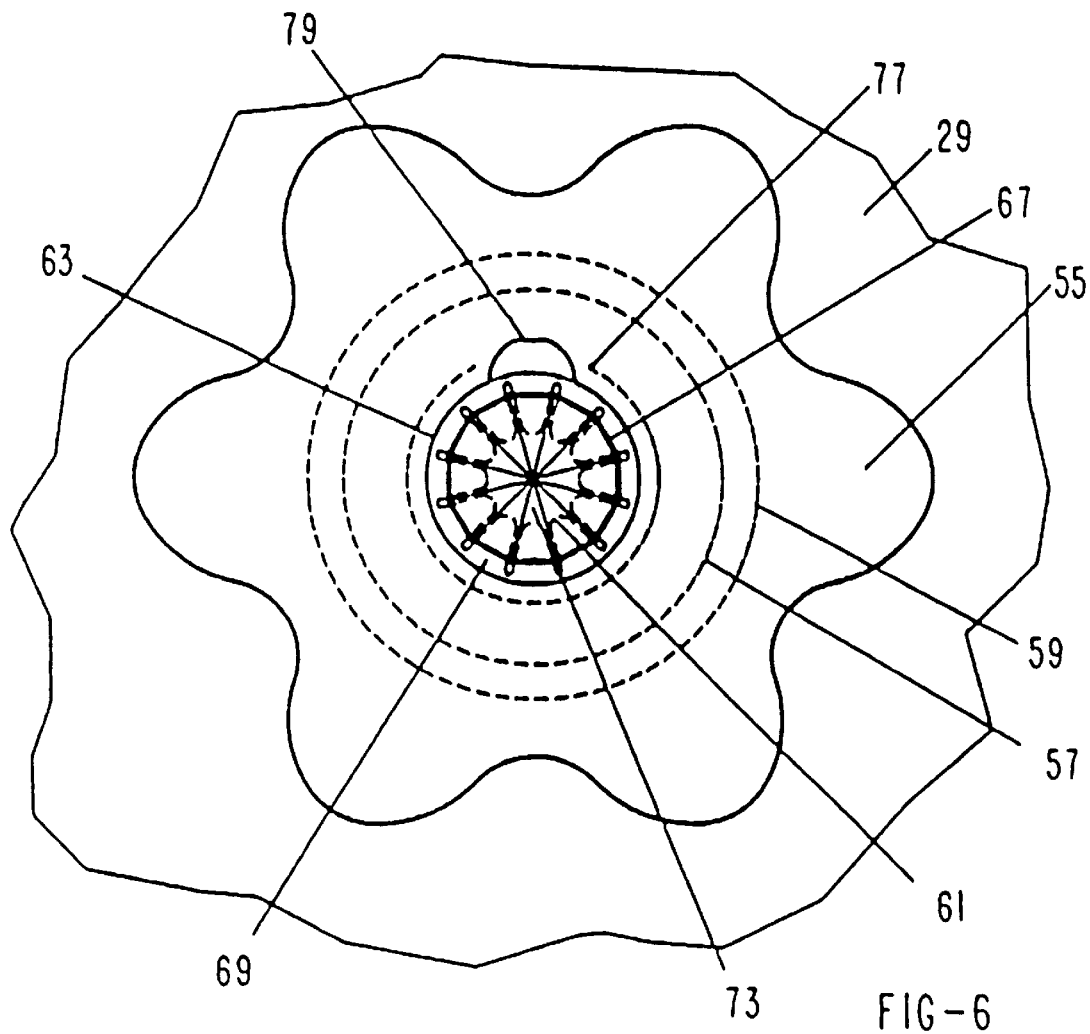
FIG. 6 depicts a top view of the restrictive access device of FIG. 5.
Figure 7:
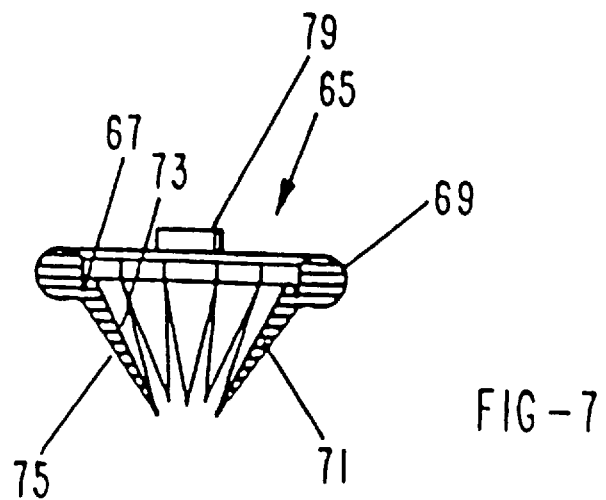
FIG. 7 depicts a side cross sectional view of the flap type barrier insert of the restrictive access device of FIG. 5.
Figure 8:
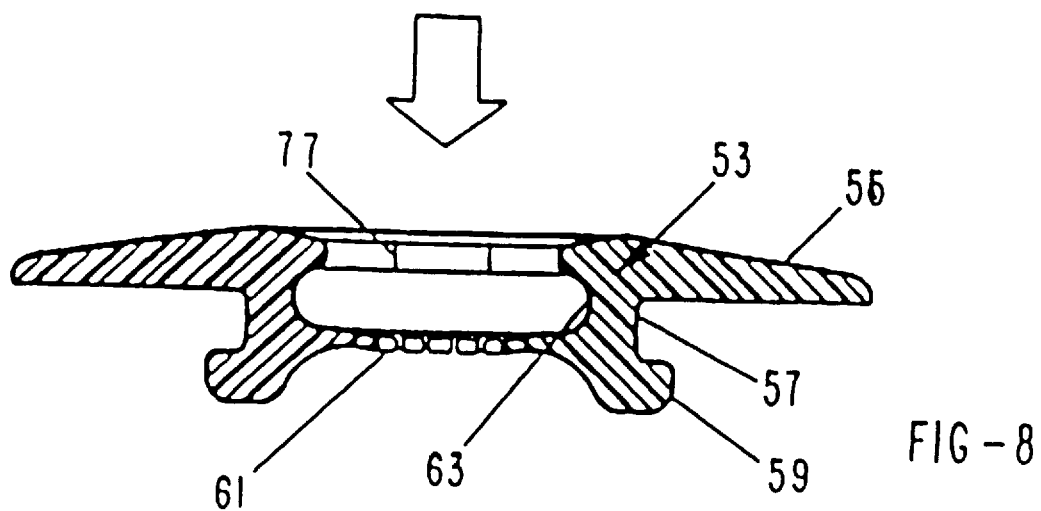
FIG. 8 depicts a side cross sectional view of the resilient housing of the restrictive access device of FIG. 5.
Figure 9:
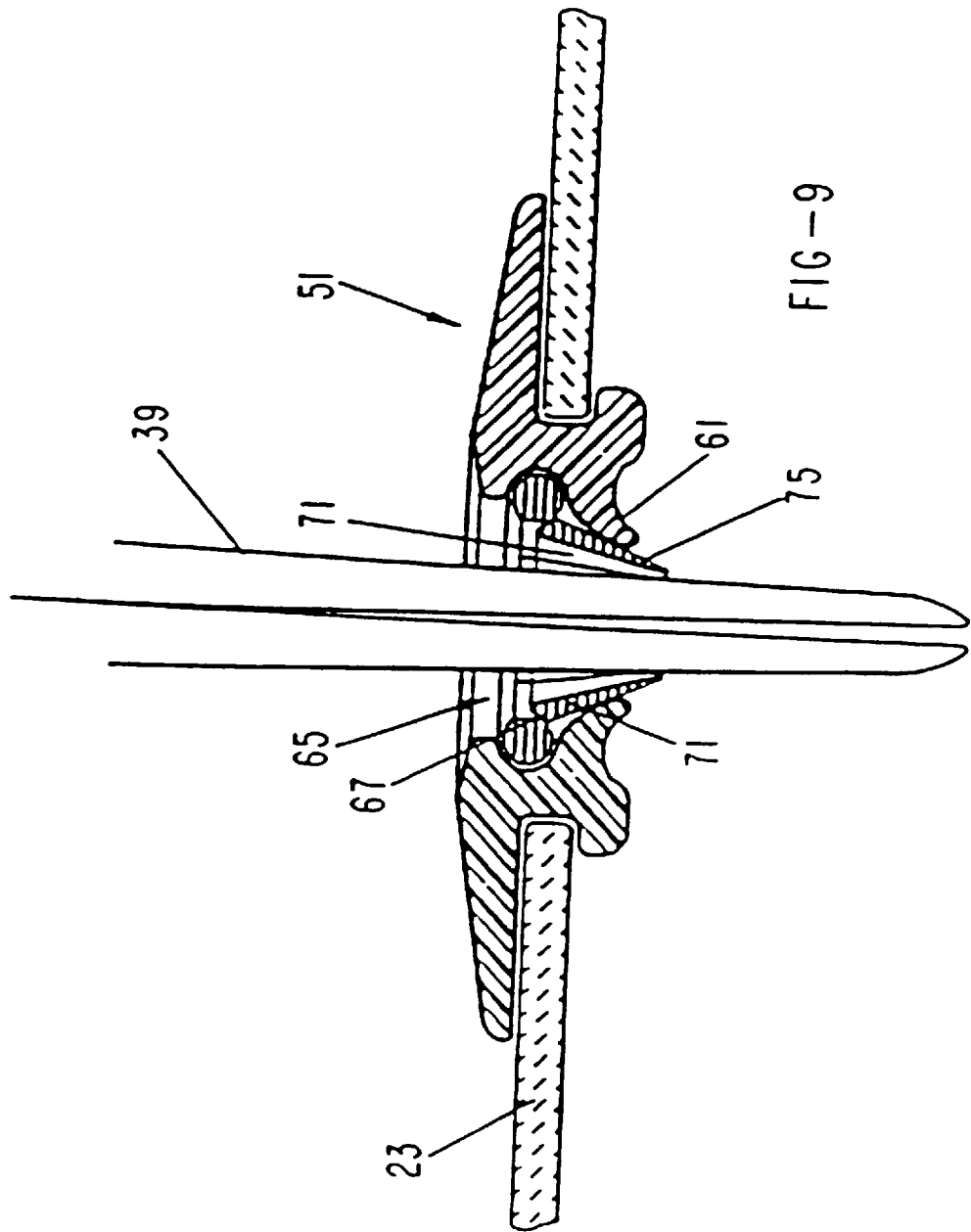
FIG. 9 depicts a side cross sectional view of the restrictive access device of FIG. 5 being penetrated by a bird's bill.

In FIGS. 5–9, a second embodiment of the restrictive access device is illustrated. Device 51 includes an annular housing 53 and barrier insert 65. Housing 53, which is made of a resilient material, includes an outer lip 55 and an inner lip 59 which are interconnected by an exterior annular groove 57. The width of the groove 57 is approximately equal to the thickness of the feeder body 23. As shown in FIGS. 5 and 8, housing 53 includes an interior annular groove 63 and a plurality of triangular shaped appendages 61 located immediately below. The interior annular groove 63 is shaped to accept barrier insert 65. Barrier insert 65 is comprised of an external ring 69 connected to a series of flaps 71 through a reduced cross sectional area 67, which acts as an integral hinge. When barrier insert 65 is seated into the housing 53, the resilient appendages 61 contact the interior surfaces 75 of the triangular flaps 71, biasing them to closure. Alignment of the insert flaps 71 and the supporting resilient appendages 61, is maintained by a node 79 on the insert ring, fitted into a slot 77 in the housing. In order to facilitate penetration of the hummingbird's bill 39, as seen in FIG. 9, the exterior surface 73 of the barrier insert flaps are made of, or coated, with a low friction material. When the birds bill 39 is withdrawn from the barrier insert 65, the insert returns to the normally closed position as seen in FIG. 5.

Figure 12:
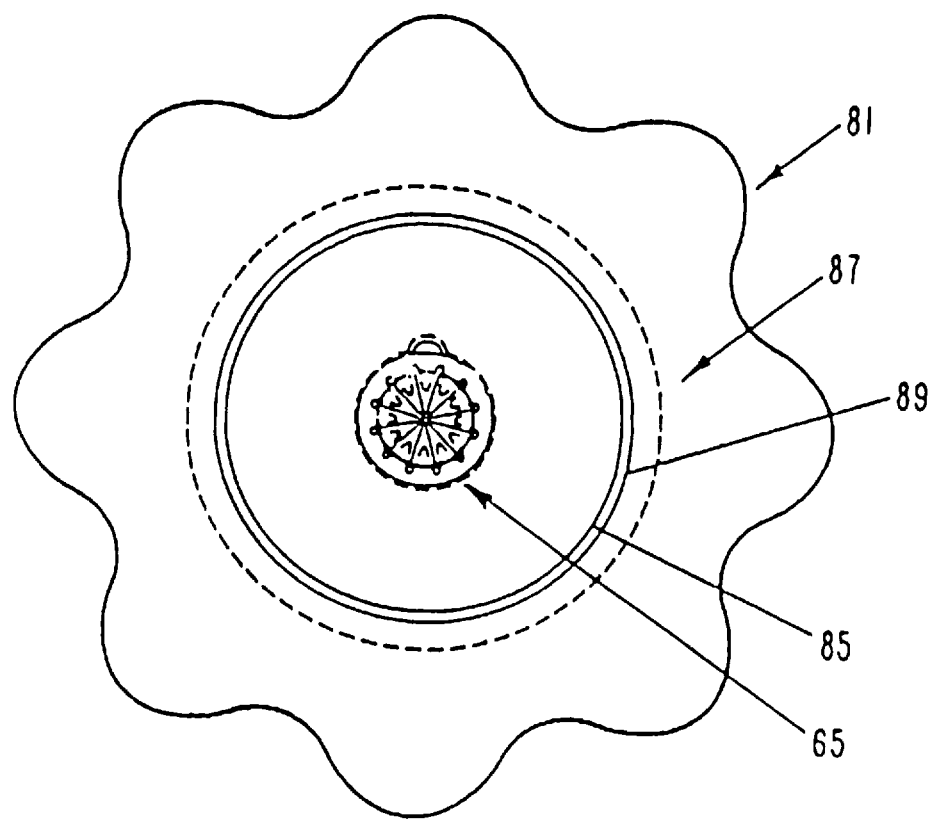
FIG. 12 depicts a top view of the restrictive access device of FIG. 10 and the conventional hummingbird feeder flower cup of FIG. 11 assembled.
Figure 13:
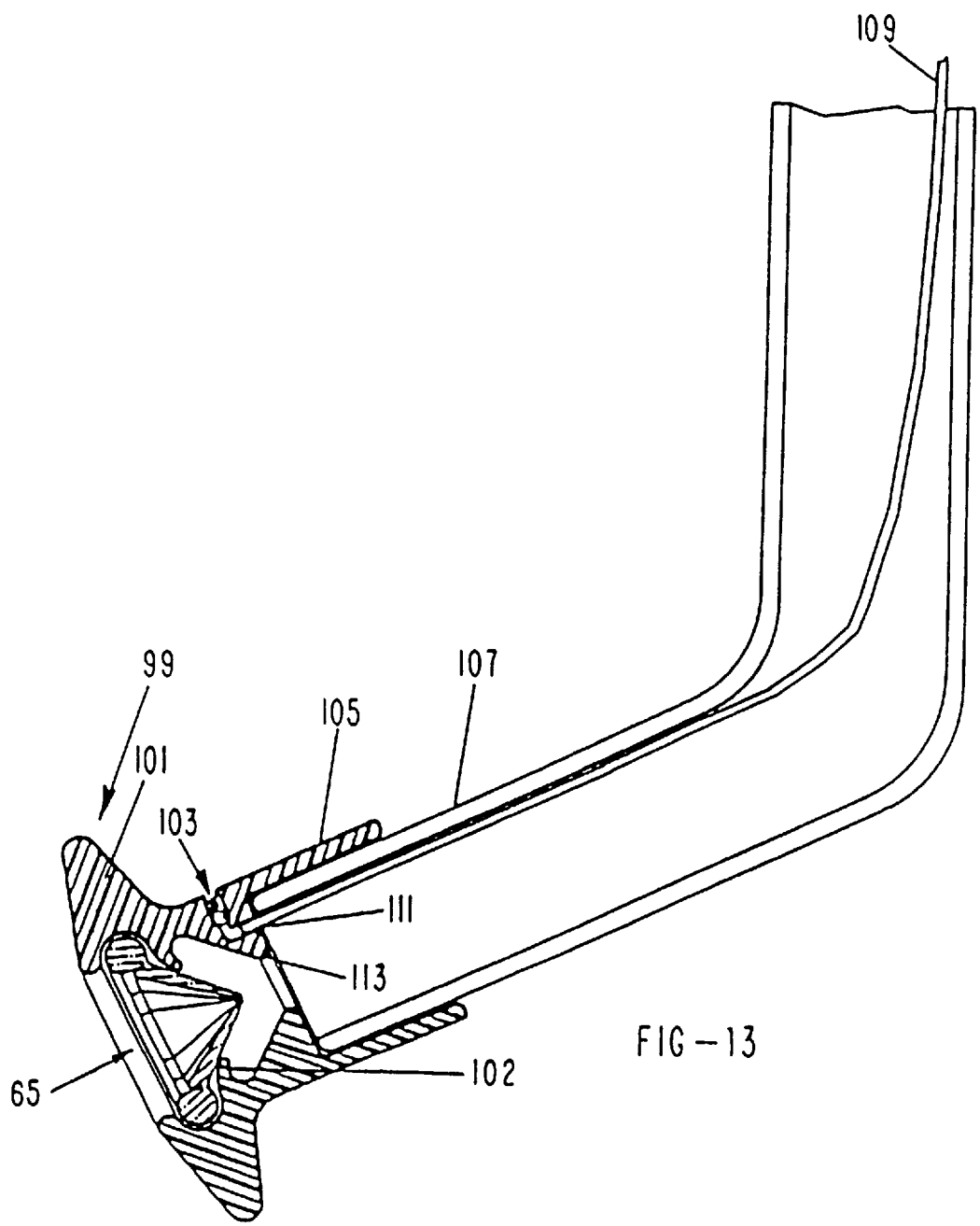
FIG. 13 depicts, on a different scale, a side cross sectional view of the restrictive access device of FIG. 5 configured to fit an inverted type tube feeder.

Referencing FIGS. 10–12 there is shown a construction of the restrictive access device 81 adapted to fit within a plastic flower cup 87, in place of a conventional bee guard. Restrictive access device 81 functions as an insect barrier, identical to the device of FIG. 5, the only difference being the way it is mounted to the feeder. The resilient housing 83 of the device 81 is configured in the form of a disk with a vertically extending skirt 85, sized to form an interference fit with the side walls 89 of the plastic flower cup 87. Restrictive access device 81 is attached, by pushing it into the plastic flower cup 87, as shown by arrow 90. The resulting assembly is shown in FIG. 12.

Figure 14:
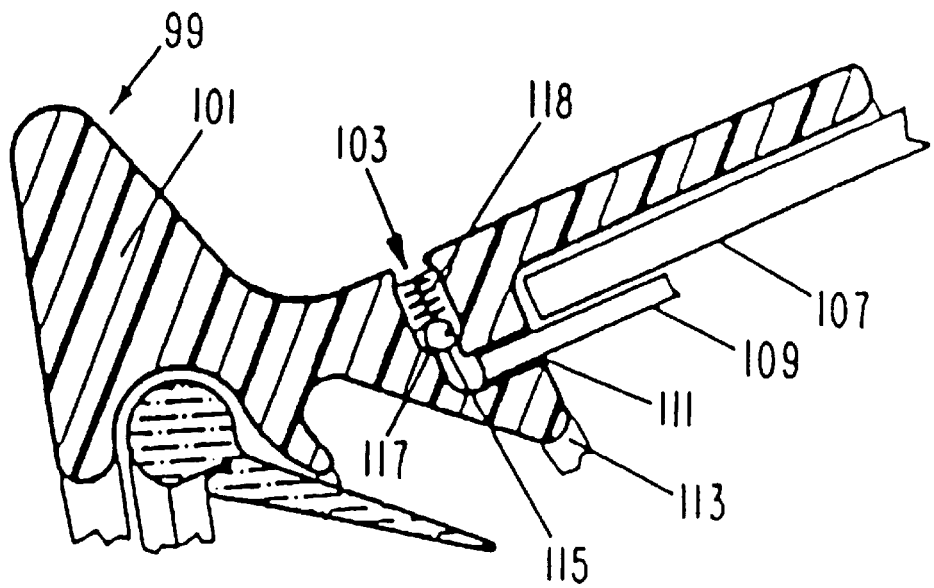
FIG. 14 depicts an enlarged view of the check valve (in its closed position) of the device of FIG. 13.
Figure 15:
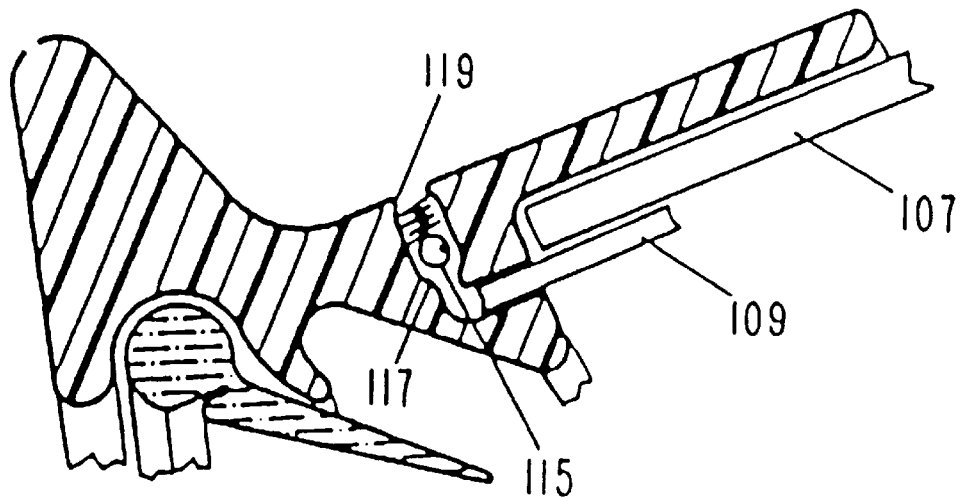
FIG. 15 depicts an enlarged view of the check valve (in its open position) of the device of FIG. 13.
Figure 16:
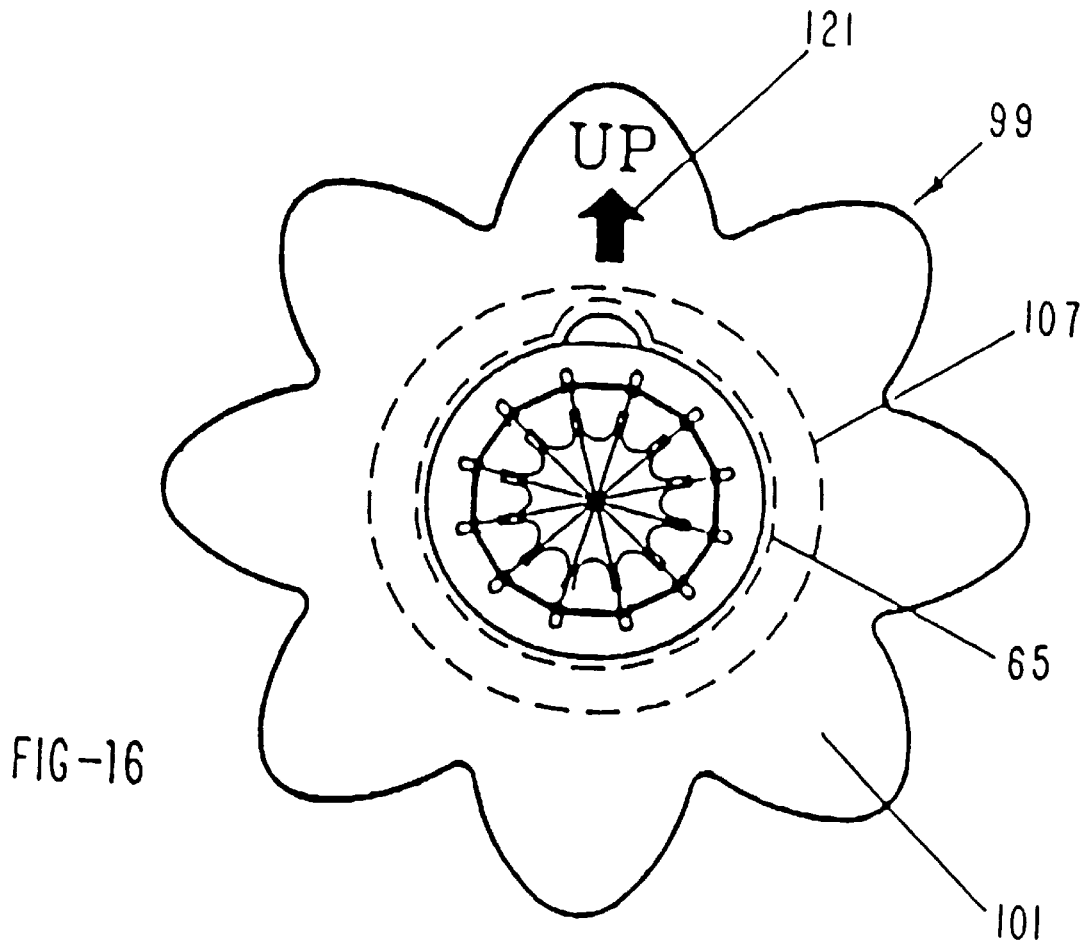
FIG. 16 depicts a frontal view of the device of FIG. 13.
Figure 17:
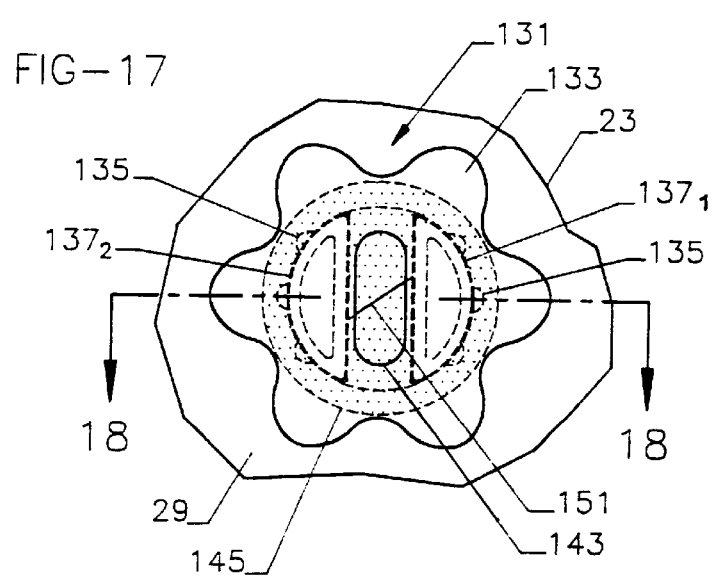
FIG. 17 depicts a top view of a two piece restrictive access device with a removable flap type barrier.

Referencing FIGS. 13–16 there is shown the restrictive access device 99 constructed to fit the tube of an inverted-type nectar feeder. Restrictive access device 99 functions as a barrier to insects identically to the device of FIG. 5 (by incorporating barrier insert 65), but is shaped to fit the feeder tube 107, and incorporates an integral pressure relieving valve 103. Resilient housing 101 includes an extended skirt 105 that is sized to fit snugly over the feeder tube 107. Restrictive access device 99 incorporates an integral pressure relieving valve 103 to reduce the dripping that typically occurs with inverted type feeders. Dripping results due to rising ambient air temperatures and the resultant expansion of the air in the space above the nectar reservoir (not shown). This expansion forces nectar from the feeder reservoir, out through feeder tube 107. To relieve this pressure, a breather tube 109 extends from the air space above the nectar to an opening 111 in the housing 101. Breather tube 109 is interference fitted with the opening 111, that connects to the outside air through an integrally formed valve seat 117, and check ball 115, as seen in FIG. 14. Under normal, reduced pressure conditions, check ball 115 maintains an airtight seal on the valve seat 117. In times of increasing ambient temperatures, positive pressure above the nectar reservoir, passes through the breather tube, lifting check ball 115 off the valve seat 117, against gravity or very light spring 118, as seen in FIG. 15. Check ball 115 and spring 106 are retained in the housing 101 by pushing them past the reduced diameter lip 119. A reduced diameter orifice opening 113 is incorporated into the resilient housing 101, to allow for sufficient pressure to build above the nectar reservoir, to open the valve 103, before significant dripping occurs. FIG. 16 shows a graphic symbol 121 that is used to show the correct orientation of the device 99, when gravity alone, is used, to seat the check ball 115.

The following described embodiments and constructions were developed to simplify the manufacturability and the performance of the restrictive access devices of the present invention.

Referencing FIGS. 17–20, restrictive access device 131, formed of a semi-rigid or resilient material, includes an outer flange 133 and inner nodes 135 which are connected by a pair of semi-circular walls $137_1$, and $137_2$. The height of walls $137_1$, and $137_2$ is approximately equal to the feeder body 23 (of a typical nectar-type bird feeder). Restrictive access device 131 is held in place when surface 139 of flange 133 and surface 141 of nodes 135 are in engagement with feeder body surfaces 29 and 31. The restrictive access device 131 is installed into the feeder body 23 by pushing the inner nodes 135 past the feeder body 23 opening 142. The restrictive access device 131 includes an access opening 143 and an internal seating surface 145 immediately beneath. As seen in FIG. 18, prior to installing the restrictive access device 131 into the feeder body 23, it is necessary to position the resilient barrier sheet 147 on the underside of the restrictive access device 131. Once the assembly is snapped into the feeder body 23, barrier sheet 147 is located on seating surface 145 directly below access opening 143 and between feeder body surface 29 and the restrictive access device surface 139. Barrier sheet 147 is further located by the semi-circular walls $137_1$, and $137_2$, due to it having complimentary semi-circular cutouts, as shown at $149_1$, and $149_2$ in FIG. 18A, each having a semi-circular surface $150_1$ and $150_2$, which engage walls $137_1$ and $137_2$. Barrier sheet 147 is cut through at 151 to form flaps 153 and 155 that are in contact with the seating surface 145, thereby forming an insect barrier beneath the restrictive access device opening 143. Barrier flaps 153 and 155 are pushed off the seating surface 145 by the penetration of the bird's bill 39 as shown in FIG. 20. Barrier flaps 153 and 155, being formed of a resilient material, will return to the normally seated and closed position when the bill 39 is withdrawn. The embodiment shown has two barrier flaps 153 and 155, but could be configured to have from only one, to many of them. In the event that only one barrier flap is used, it would be possible to construct the restrictive access device with a tapered interior orifice, the inside wall of the orifice acting as the seating surface for the outside edge of the barrier flap.

With reference to FIGS. 21–23, restrictive access device 161, which is made of a resilient material (such as silicone, or urethane), includes an outer flange 163 and an inner lip 165 which are interconnected by an exterior annular groove 167. The width of the groove 167 is approximately equal to the thickness of feeder body 23 (of a typical nectar-type bird feeder), whereby surfaces 171 and 173 are in engagement with feeder body surfaces 29 and 31. Restrictive access device 161 includes a barrier structure consisting of a plurality of triangular-shaped flaps $179^1$, $179^2$, $179^3$ that are in contact at their edges, thereby forming an effective closure as shown in FIG. 21. An optional reduced cross section at 181 where flaps $179^1$, $179^2$, and $179^3$ join the access device inner wall 183 forms an integral hinge 181. This hinge 181 acts to reduce the force required for a bird's bill 39 to penetrate barrier flaps $179^1$, $179^2$, and $179^3$, as illustrated in FIG. 23. Finally, because birds, particularly hummingbirds, are extremely sensitive to any surface friction encountered by their bill and, in fact, will not attempt to penetrate the barrier flaps $179^1$, $179^2$, and $179^3$ if any appreciable surface friction is encountered (such as is typical of many resilient materials) it is necessary that the exterior surface of flaps $179^1$, $179^2$, and $179^3$ be of low surface friction. This can be accomplished by using a unique or specially formulated resilient material having low surface friction characteristics, or by using a low friction material, such as Teflon, to coat the exterior surfaces of the flaps $179^1$, $179^2$, and $179^3$.

With reference to FIGS. 24 and 25, restrictive access device 191 is constructed from a semi-rigid material (such as nylon) and includes an outer lip 193 and nodes 195 which are interconnected by a segmented inner wall 201 thus forming a segmented exterior annular groove 197. The width of the groove 197 is approximately equal to the thickness of the feeder body 23 (of a typical nectar type bird feeder) whereby surfaces 199 and 200 are in engagement with feeder body surfaces 29 and 31. Inner wall 201 may incorporate material cutouts 203 to allow for the necessary distortion of the nodes 195 to fit into the feeder body 23. Restrictive access device 191 includes a barrier structure consisting of a series of radially projecting filaments 205 which are in radial contact and thereby present an effective closure barrier, as shown in FIG. 24. As seen in FIG. 25, filaments 205 may have a reduced cross-sectional area as shown at 207 so as to be easily deflected by the penetration of a bird's bill.

A differently constructed embodiment of the restrictive access device 211 of the invention is shown in FIGS. 26 through 28. Restrictive access device 211 is held in the feeder body 23 by the contact of the underside surface of device flange 213 and the bottom lip 215 with external surface 29 and internal surface 31, respectively. Restrictive access device 211 has an undercut groove 217 within the device access opening 219. Groove 217 is adapted to receive a filament-type barrier insert 221 as shown in FIG. 26A and 27. Barrier insert 221 is constructed of a multitude of filaments or bristles 223, held in place by twisted wire 225. Barrier insert 221 is configured in a ring, as shown in FIG. 26A, in order to dispose the filaments 223 radially towards the center of the restrictive access device 211. The barrier insert 221 is inserted into the restrictive access device 211 by pushing it past the opening 219 into the under-cut groove 217. Insertion of the barrier insert 221 acts to deflect the outer portions of all filaments 223 radically inward as illustrated in FIG. 27. Brush-type barrier insert 221 is held in place in restrictive access device 211 by the spring tension of the twisted wire 225, or the resilient compression of the device undercut groove 217, or both. The restrictive access device 211 is shown being penetrated by a bird's bill in FIG. 28. In order for the filament-type barrier to prevent insect entry, while still being relatively easy for feeding bird's to penetrate, the bristles or filaments should be numerous and of small cross-sectional area.

The FIGS. 29 and 30 show a simplified filament-type restrictive access device 231. This construction of the restrictive access device 231 consists of little more than the filament-type barrier insert of the prior described embodiment. Restrictive access device 231 is attached directly to the feeder body 23 with the retaining clips 233. The clips 233 act to hold the device in place by contacting the feeder body 23 internal surface 31 and external surface 29. The clips 233 are attached to the device 231 by winding them between the twisted wire 235, forming them from an integral loop of wire, or by spot welding them in place. Installation of restrictive access device 231 is easily accomplished by compressing the ring formed by twisted wire 235 and allowing it to snap back with the retaining clips 233 engaging the feeder body 23. The filaments 237 are readily displaced by the penetration of a bird's bill. This construction of the filament-type barrier embodiment of the restrictive access device of the invention has an added advantage over the prior embodiments because the array of filaments 237 extends both over and away from the feeder opening. This extension of the bristles 237 away from the opening, will discourage larger insects from getting close to the opening in feeder body 23. Further, the filaments of both of the brush-type barrier embodiments can be cut with a relatively sharp point, to further discourage insects from forcing their way into to feeder.

It should be noted that although both of the filament type barrier embodiments described used a circular brush configuration, any filament type barrier configuration, if sufficiently dense, would function adequately. Filaments may be made from nylon, polyester or natural fiber. Referring to FIGS. 31–33, a fluted barrier structure embodiment of the present invention is shown. Restrictive access device 241 includes an outer flange 243 and inner lip 245 which are interconnected by an exterior annular grove 247. Outer flange 243 is connected to the inner lip 245 by the access device inner wall 253, and includes groove 247 the width of which is approximately equal to that of the feeder body 23 (of a typical nectar type bird feeder) whereby surfaces 249 and 251 are in engagement with feeder body surfaces 29 and 31. Restrictive access device 241 includes an access barrier 255 consisting of a fluted structure which is biased to normally close the feeder orifice. Barrier structure 255 consists of a series of interconnected flutes 257 coming together at 259 to form an expandable closure. FIGS. 31A and 31B show alternate fluted barrier configurations with fewer flutes. As shown in FIG. 33, the penetration of the fluted barrier structure 255 by a bird's bill 39 causes flutes 257 to expand and separate at 259, thus allowing access to the nectar feeder contents. By virtue of being constructed of a resilient material, barrier structure 255 will return to the normally closed position upon withdrawal of the bird's bill 39.

Figure 34:
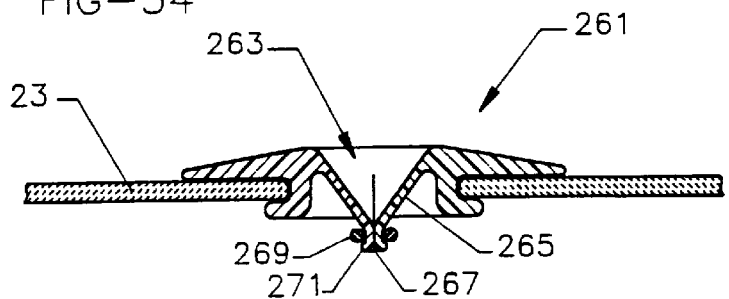
FIG. 34 depicts a side cross sectional view of a two piece, webbed type barrier restrictive access device of the present invention.
Figures 34A, 34B:
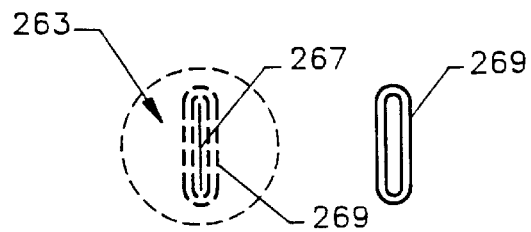
FIG. 34A depicts a top view of the webbed barrier structure of the device of FIG. 34.
FIG. 34B depicts a top view of the closure band of the device of FIG. 34.
Figure 35:
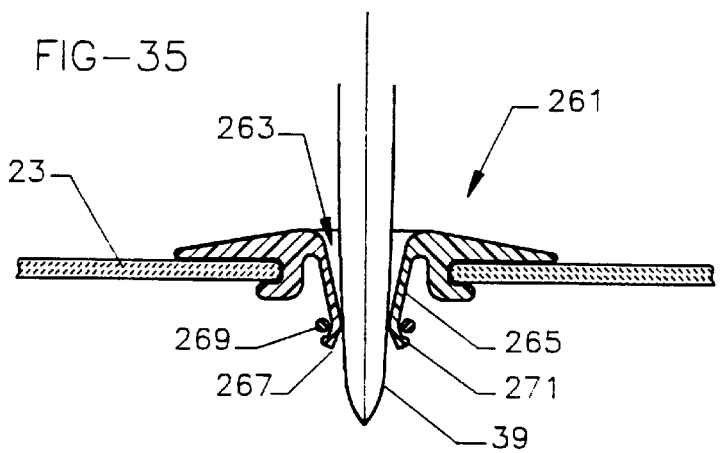
FIG. 35 depicts the device of FIG. 34 being penetrated by a bird's bill.
Figures 35A, 35B:
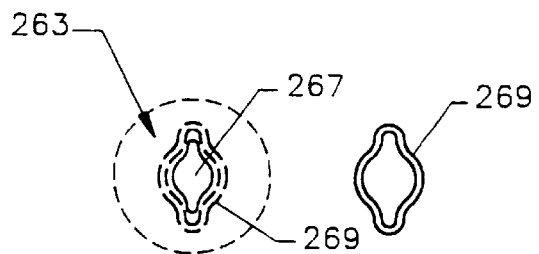
FIG. 35A depicts a top view of the webbed barrier structure of the device in the position illustrated in FIG. 35.
FIG. 35B depicts a top view of the closure band of the device in the position illustrated in FIG. 35.

Referring to FIGS. 34–35B there is shown a restrictive access device 261 of the present invention with a web type barrier, constructed from a pliable material. Restrictive access device 261 is held in place over the feeder opening in an identical manner as that previously described for the fluted type barrier shown in FIG. 32. The barrier structure 263 of restrictive access device 261 is shaped as a single web or reed as shown in FIGS. 34 and 34A. Barrier structure 263 consists of a flexible wall 265 being held in a closed or crimped position as seen at 267 by the applied pressure of a resilient, constricting band 269. Constricting band 269 may be integrally molded, adhesively bonded, or retained by other means, including being held by an increased cross sectional area of the flexible wall 265 as shown at 271. Restrictive access device 261 is shown in FIG. 35 being penetrated by a bird's bill 39. This penetration forces the barrier structure 263 to separate, pushing flexible wall 265 against the constricting band 269. As shown in FIG. 35A, distortion of the constricting band 269 will allow access to the nectar feeder contents and return barrier structure 263 to its closed condition upon withdrawal of the bird's bill 39. The primary advantage of this embodiment of the invention is that with the exception of the resilient constricting band 269, the device can be constructed from an extremely pliable and not by necessity resilient material. This embodiment of the restrictive access device would allow for an extremely low surface friction resisting force upon bill insertion, and the precise control, depending on the size and geometry of the resilient constricting band 269, of the penetration forces required.

Figure 36:
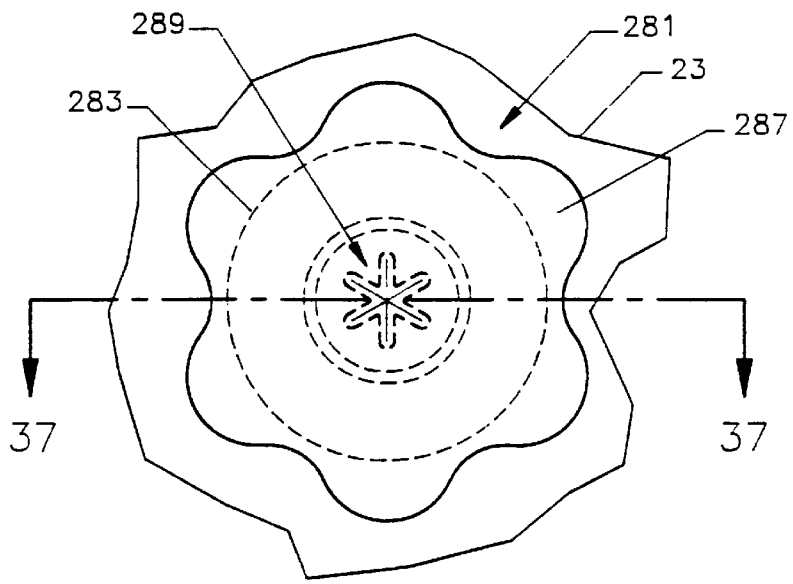
FIG. 36 depicts a top view of an adhesively attached construction version of the restrictive access device of the present invention.
Figure 37:
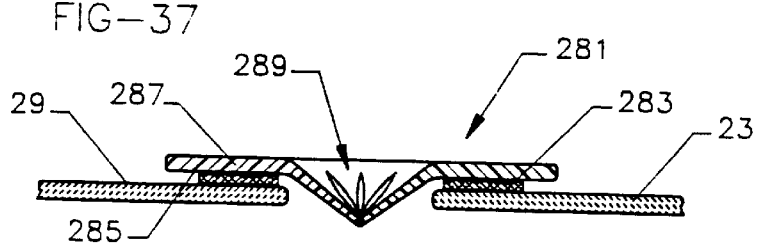
FIG. 37 depicts a side cross sectional view of the device of FIG. 36.

Referring to FIGS. 36 and 37, there is shown an adhesively mounted construction of the restrictive access device of the invention. Restrictive access device 281 is held in place on the feeder body 23 by an annular shaped adhesive disk 283. The adhesive disk 283 lying in contact between the underside, and possibly textured, surface 285 of the restrictive access device flange 287 and the outside surface 29 of the feeder body 23 acts to hold the restrictive access device 281 in place. As in the prior described embodiments, insects are prevented from gaining access to the feeder interior by the fluted barrier structure 289, of similar construction to that illustrated in FIG. 31.

The adhesively mounted restrictive access device 281 would be readily adaptable to any embodiment previously described in this specification. The restrictive access device 281 could be provided with the adhesive disk 283 attached or provided as a separate piece. In either instance, the exposed surfaces of the adhesive would be protected with a peel away backing. The primary application of this adhesively mounted device, would be for feeders with smaller type feeding openings that are not typically defined by any floral shaped insert.

Figure 38:
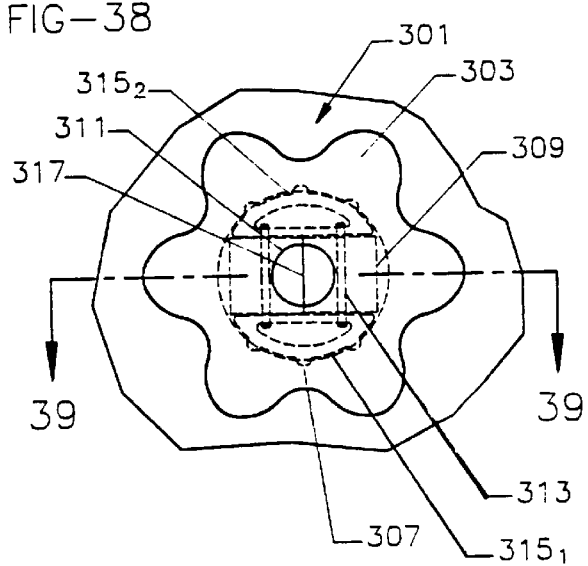
FIG. 38 depicts a top view of a gravitationally biased barrier restrictive access device of the invention.
Figure 39:
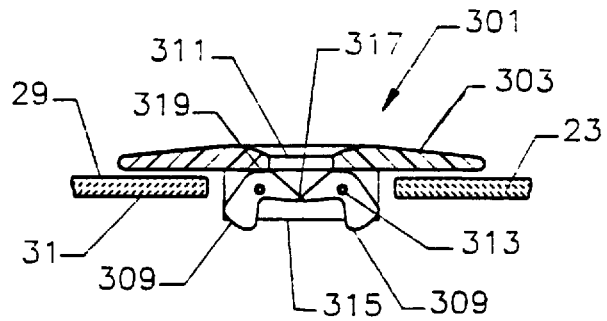
FIG. 39 depicts a side, partial cross sectional view of the device of FIG. 38.
Figure 39B:
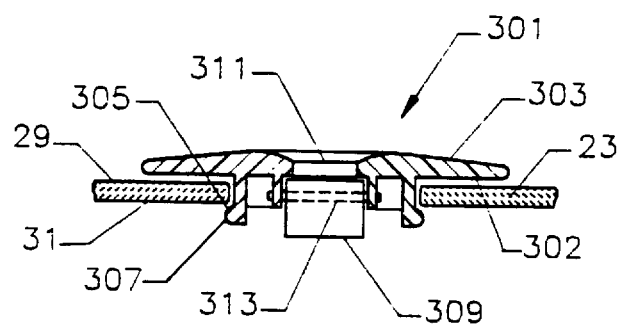
FIG. 39B depicts a one quarter rotation of the view of FIG. 39.
Figure 40:
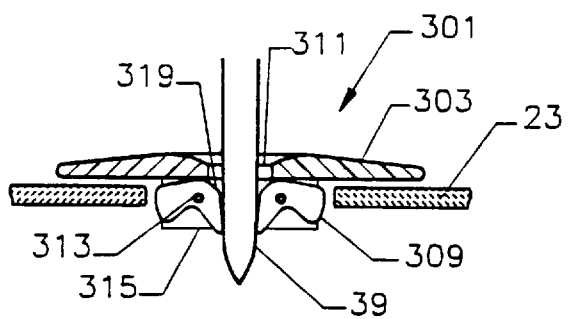
FIG. 40 depicts the device of FIG. 39 being penetrated by a bird's bill.

Referring to FIGS. 38–40, there is shown a gravitationally biased barrier embodiment of the restrictive access device of the invention. As seen in FIG. 39B, restrictive access device 301 is secured to the feeder body 23 by the contact of the underside 302 of the flange 303 and the upper surface 305 of the node 307 with the feeder body 23 surfaces 29 and 31 respectively. Restrictive access device 301 is snapped into the feeder body 23 in a similar manner to the device shown in FIG. 17. Restrictive access device 301 has a gravitationally biased barrier, consisting of a pair of counter weighted gates 309 located immediately below the device access orifice 311. Gates 309 are designed to rotate freely at hinge pins 313, that are interference fitted in the inside walls of the semi-circular structures $315_1$ and $315_2$. Gates 309 are gravitationally biased to remain closed as seen at 317 in FIG. 39, by virtue of having a greater mass on the pivot-side opposite the device access orifice 311. In order that the two gates present an effective barrier as seen at 317, it is necessary that they contact or nearly contact the underside of access orifice 311, as seen at 319.

As seen in FIG. 40, counter-weighted barrier gates 309 are easily displaced by the penetration of a bird's bill 39. An advantage of this counter-weighted barrier embodiment is that the amount of force required for penetration is easily controlled by the balance of mass of the gates relative to the pivot-point.

Figure 41:
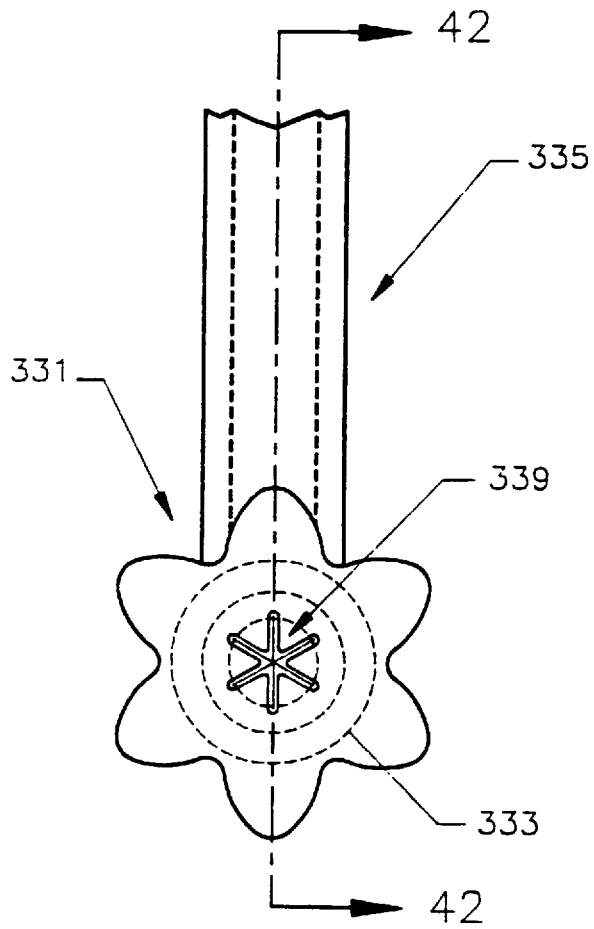
FIG. 41 depicts a frontal view of an unitarily constructed, inverted feeder construction restrictive access device of the invention.
Figure 42:
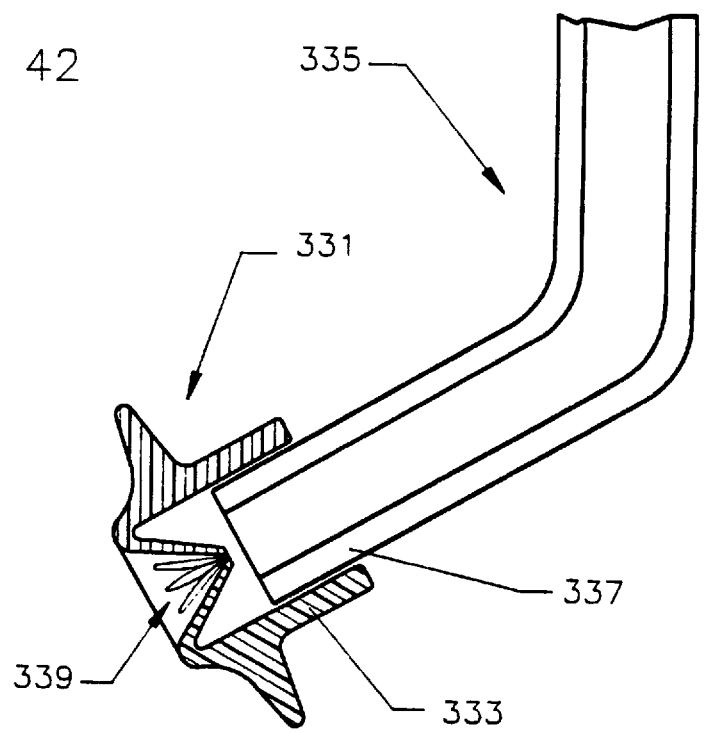
FIG. 42 depicts a side cross sectional view of the device of FIG. 41.

Referring to FIGS. 41 and 42, there is shown another restrictive access device of the invention, constructed to fit on an inverted type tube feeder. Restrictive access device 331 has a flexible annular skirt 333 adapted to fit over end 337 of feeder tube 335. The barrier structure 339 of restrictive access device 331 can be in the form of any embodiment previously described in this specification.

Figure 43:
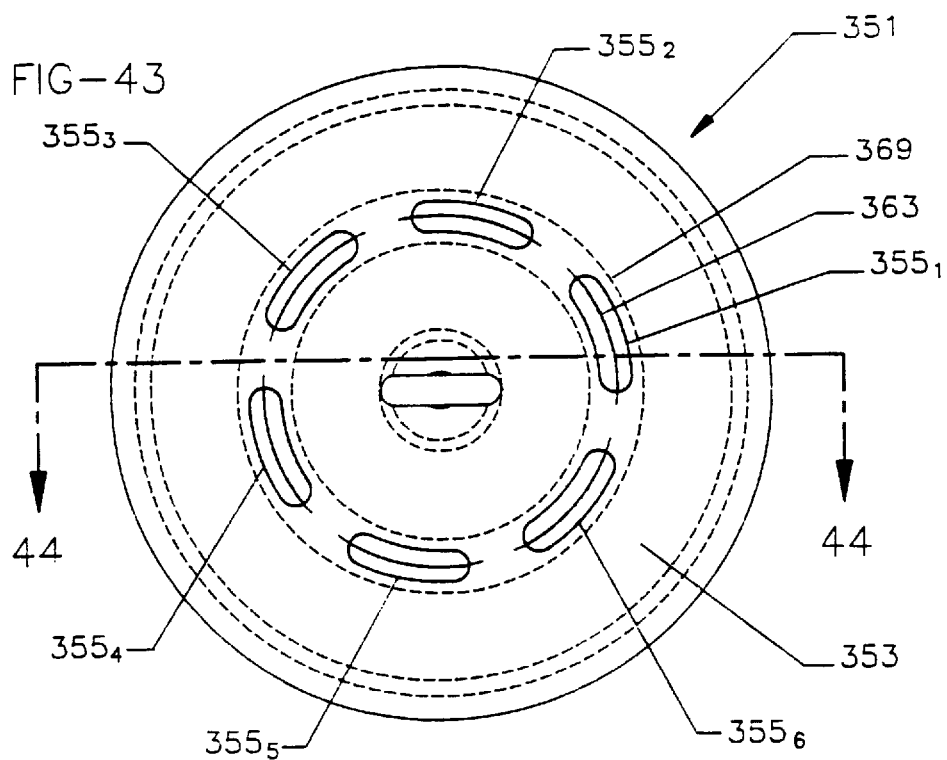
FIG. 43 depicts a top view of a saucer type nectar feeder with the restrictive access barrier incorporated integrally within the feeder top.
Figure 44:
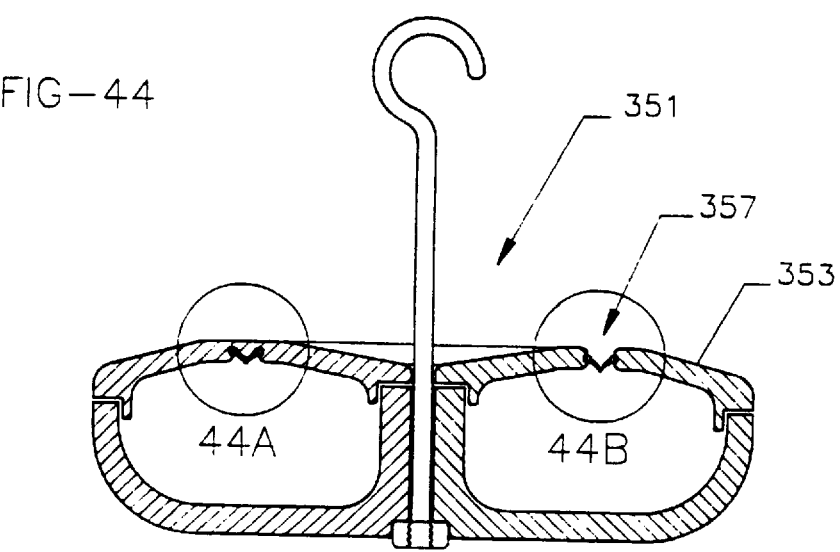
FIG. 44 depicts a side cross sectional view of the device of FIG. 43, taken along lines 44—44.
Figure 44A:
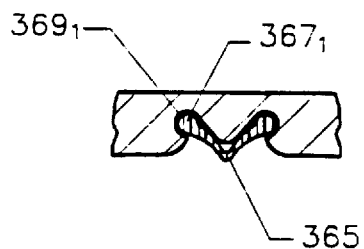
FIG. 44A depicts an enlarged view of the annular restrictive access barrier portion of FIG. 44 covered by the feeder top.
Figure 44B:
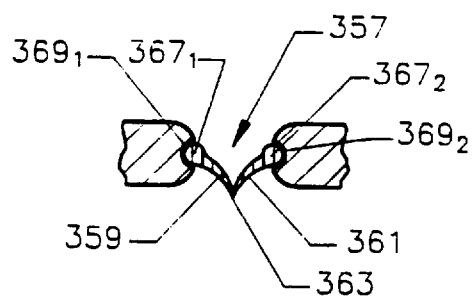
FIG. 44B depicts an enlarged view of the exposed annular access barrier portion of FIG. 44.
Figure 44C:
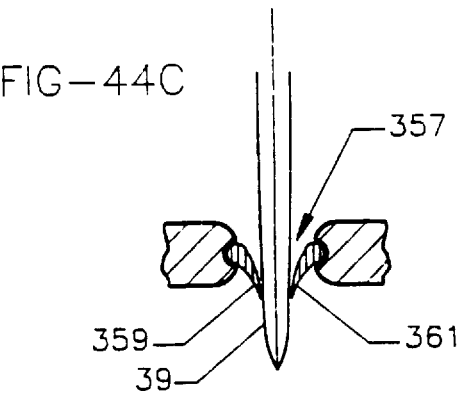
FIG. 44C depicts an enlarged view of the annular access barrier portion of FIG. 44B being penetrated by a bird's bill.

Referring to FIGS. 43–44C, there is shown an embodiment of the restrictive access device of the invention 351, built integrally within the lid 353 of a typical saucer type nectar feeder. This feeder 351 has a lid 353 provided with a series of circumferential cutouts $355_1$–$355_6$ which expose annular shaped barrier structure 357. Annular shaped barrier structure 357 is formed by the contact of an inside wiper 359 and outside wiper 361, as seen in FIG. 44B. These wipers 359 and 361, being formed of a resilient material, come together to form an effective barrier closure as seen at 363. In order to ensure uniform alignment between the inside and outside wipers 359 and 361, annular barrier structure 357 is of unitary construction as shown at 365 in FIG. 44A. The points 365 where the inside and outside wipers 359 and 361 are integral, will be located opposite the feeder lid 353 circumferential cutouts $355_{1-6}$, in order not to be accessible to the feeding bird's bill. Annular shaped barrier structure 357 may be attached to the feeder lid 353 by providing increased sections $367_1$, and $367_2$, adapted to be interference fitted to annular grooves $369_1$, and $369_2$ in the feeder lid 353. The annular shaped barrier structure may be attached to the feeder lid 353 by other means including, but not limited to, a self adhesive attachment as previously described in this specification. It may prove to be desirable that the attachment means allow for some radial compression of annular barrier structure 357 to allow the inside and outside and outside wipers 359 and 361 to be forced into contact as shown at 363, in FIG. 44B. Annular barrier structure 357 is easily penetrated by a bird's bill 39 as seen in FIG. 44C, and will return to the normally closed position, as seen in FIG. 44B, upon withdrawal of the bird's bill.

Virtually any of the prior described restrictive access devices could be constructed in order to fit a specially adapted saucer feeder lid.

Lastly, it should be noted that the opening required for hummingbirds to feed is quite small, down to approximately 1/16" across. This very small opening is sufficient in size, as these birds feed by lapping the nectar with their tongues. All of the appended figures show an exaggerated relative size of the barrier structures, and in those showing bill penetration, greatly exaggerate the degree of penetration. This was done to more clearly illustrate the structures and functioning of the various barrier embodiments.

Others may practice this invention in any of the numerous ways which will be suggested to one skilled in the art upon reading this disclosure. All such practice of the invention is considered to be covered hereby provided it falls within the scope of the appended claims.

I claim:

1. A restrictive access device for mounting at a feeder opening of a nectar type bird feeder, said access device including:

a. a barrier which, when said barrier is installed at said feeder opening, is in a first position which closes said feeder opening sufficiently to prevent insects from passing through said feeder opening, said barrier being movable to a second position by the pressure of a bird's bill to permit nectar feeding, said barrier returning to substantially said first position when said bill is withdrawn; and b. means to position said access device adjacent to said feeder opening, thereby positioning said barrier at said feeder opening when said barrier is in said first position.

2. The restrictive access device of claim 1, wherein said access device includes an annulus having a center axis, and wherein said barrier includes a normally closed rosette of triangular flaps, each of said flaps having a base edge, two side edges and an apex, each said base edge connected to said annulus, each said side edge normally engaging said side edge of an adjacent flap when said rosette is closed, said apexes being at, approximately, said center axis of said annulus when said rosette is closed, said flaps being adapted to move to said second position with said apexes separating to open said rosette when a bird's bill is thrust therein.

3. The restrictive access device of claim 2, wherein said triangular flaps are internally biased to said first position to form said normally closed rosette.

4. The restrictive access device of claim 2, wherein said access device includes means, separate from said flaps, for biasing said flaps to said first position to form said normally closed rosette.

5. The restrictive access device of claim 2, wherein said triangular flaps are formed integrally with said annulus.

6. The restrictive access device of claim 1, wherein said barrier consists of a plurality of flexible filaments and means for holding said filaments in a predetermined pattern.

7. The restrictive access device of claim 6, wherein each of said filaments has a first and second end, and said means for holding said filaments is in the form of a loop, at least a portion of said first ends projecting into the interior space defined by said loop.

8. The restrictive access device of claim 7, wherein said positioning means is a plurality of clips secured to said filament holding means.

9. The restrictive access device of claim 7, wherein said access device includes an annulus, said annulus including said positioning means, said annulus further including means to hold said barrier adjacent to said filament holding means.

10. The restrictive access device of claim 1, wherein said restrictive access includes an annulus, said annulus including said positioning means, said annulus further including a seating surface, and wherein said barrier is at least one flap, normally biased into contact with said seating surface of said annulus and adopted to swing to said second position in response to pressure from a bird's bill.

11. The restrictive access device of claim 1, wherein said restrictive access includes an annulus, said annulus including said positioning means, said annulus further including an opening, and wherein said barrier is at least one gate connected to said annulus, said gate normally being held in said first position by gravitational force to close said annulus opening, said gate being movable to said second position in response to pressure from a bird's bill.

12. The restrictive access device of claim 1, wherein said barrier is formed of a fluted resilient material, said fluted resilient material having a normally closed opening in the center thereof through which a bird's bill may be projected and which, by virtue of being formed of resilient material, is biased to return to said closed position when the bird's bill is withdrawn.

13. The restrictive access device of claim 12, wherein said fluted resilient material is a single piece of material.

14. The restrictive access device of claim 13, wherein said restrictive access device includes an annulus, said annulus including said positioning means, and wherein said fluted resilient material is formed integrally with said annulus.

15. The restrictive access device of claim 1, wherein said barrier is formed of a web of pliable material having an opening therein, said restrictive access device including a biasing means secured to said web adjacent to said web opening to normally close said web opening, said biasing means yielding to permit said web adjacent to said web opening to move to said second position in response to pressure from a bird's bill.

16. The restrictive access device of claim 15, wherein said restrictive access device includes an annulus, said annulus including said positioning means, and wherein said web is formed integrally with said annulus.

17. The restrictive access device of claim 1, wherein said restrictive access device includes a cylindrical skirt portion, said skirt portion having an exterior surface adapted to fit with a conventional bee guard type feeder opening.

18. The restrictive access device of claim 1, wherein said restrictive access device includes a support surface, and wherein said positioning means includes a contact adhesive secured to said support surface and covered by a protective backing to be removed immediately prior to installation of said restrictive access device.

19. The restrictive access device of claim 1, wherein said means to position said barrier over said opening includes means to secure said restrictive access device to the feeding end of a conventional inverted-type feeder tube.

20. The restrictive access device of claim 19, wherein said positioning means includes a means for relieving pressure over an inverted-type feeder food reservoir.

21. The restrictive access device of claim 20, wherein said restrictive access device further includes a breather tube adapted to extend to the air space over an inverted-type feeder food reservoir.

22. The restrictive access device of claim 21, wherein said restrictive access device includes a pressure relieving valve connected to said breathing tube.

23. The restrictive access device of claim 22, wherein said pressure relieving valve includes a check ball and an integral valve seat formed in said positioning means.

24. A nectar type bird feeder, said bird feeder including:
  a. a housing for holding nectar, said housing including at least one feeder opening; and
  b. a barrier, said barrier being installed at said feeder opening, said barrier having a first position which closes said feeder opening sufficiently to prevent insects from passing through feeder opening, said barrier being movable to a second position by the pressure of a bird's bill to permit nectar feeding, said barrier returning to substantially said first position when said bill is withdrawn.

25. The restrictive access device of claim 24, wherein each said feeder opening is elongated in form and wherein said barrier comprises a pair of flexible wipers coming together at said feeder opening.

* * * * *